(12) United States Patent
Whiton

(10) Patent No.: X8427
(45) Date of Patent: Oct. 2, 1834

(54) PUMP, SUCTION

(76) Inventor: Elijah Whiton

Elijah Whiton.
Letters Patent.

The schedule referred to in these Letters Patent, and making part of the same, containing a description in the words of the said Elijah Whiton, himself, of his improvement in the common suction pump.

To all to whom these presents shall come.
Be it known, that I Elijah Whiton of Groton, in the County of Middlesex, and State of Massachusetts, have invented a new and useful improvement in the common suction pump, and that the following is a full and exact description of the construction and operation of the said pump, as invented or improved by me.

1st. The barrel of a pump made of steatite or soap-stone.

2nd. A new and useful method of uniting the barrels of pumps, (whether of stone, metal, or wood) with the lower box and pipes.

3rd. A new and useful method of constructing the lower box.

4th. A new and useful method of draining the water from pumps.

Material. A block of soapstone is either squared or made cylindrical, with projecting sides or corners at the bottom, with holes through them to admit bolts or screws with which it is fastened to a floor or platform.

Barrel. A hole of suitable dimensions is bored through the block, in a longitudinal direction, which forms the barrel of the pump. This hole is enlarged at the top of the barrel, to give room for the play of the pump-rod, and lever, or handle; and is reduced near the bottom to form either a shoulder or taper to support the lower box.

Flange. A flat ring or metal is cast or formed, exceeding in diameter the bore through the bottom of the barrel aforesaid, with a projecting part equal in diameter with, and fitted to, enter the bore at the bottom of the barrel. Said projection has a hole through the centre for the free passage of any liquor: with a screw cut in the projecting part. Another ring is made equal in diameter with the bore of the barrel, with a projection similar to that before mentioned, and a screw is cut on it, to match that in the other projection aforementioned.

Studs — The side or face of the ring last described opposite the projection, has two studs erected on the edge by which, with the aid of a suitable winch it is screwed down to its place in the bottom of the barrel. Said rings may now be denominated flanges, and are applied to the pump in the following manner, viz —

(Uniting) the parts — The flange, first described is placed underneath the pump, with the projecting part upwards, fitting the hole in the bottom of the barrel; and the other flange with the projection downwards, is passed down the barrel, until it meets and enters the projecting part of the other flange, and is screwed to it by the winch before named, thereby embracing the bottom, or pressing the sides of the barrel, if conical, between the flanges, and by the interposition of collars of leather, is made a joint imper=vious to air and water.

Conduit — A lead, stone, or other pipe may be united with the pump, to establish a communication with a fountain of liquor by being soldered or screwed to the lower flange.

Valve — (The upper face of the upper flange is made smooth and even, to receive a suitable valve, which is formed after the common method.

Catch piece — (Upon this valve is erected a stud or spring, the top of which is made with a notch or catch of a triangular (Δ) or conical (Δ) form.

Bucket of wood — (The upper box or bucket is made after the common form, with this addition when of wood — viz); the face on which the valve shuts, is made of a plate of metal, firmly attached to the wood, or a ring of metal is fastened to the bottom of the bucket, with a hole through the centre, less in diameter, than the bore of the bucket at the bottom, so as to leave a projecting edge of metal within the bore of the bucket.

*Bucket of metal* – A similar projection is cast in the bucket, when made of metal: – or turned, when of soapstone. The other parts of the pump, and the mode of operation, are similar to those commonly used.

*Operation of the discharging apparatus* – When the handle of the pump is raised to the highest point of motion, the bucket will descend low enough to permit the yielding stud, or spring before described, on the lower valve, to push open the lower valve on the bucket and by its elasticity), to catch on the edge of metal before described in the bucket. Then, by bearing down the handle, the lower valve is drawn open, and the water or other liquid is drained from the pump, to prevent accident by frost. Then, bearing down the handle to its lowest point of motion, the catch is unlocked, and the valves set free. Or the parts may be so adjusted, that the catch may take hold of the ring on the lower end of the bucket, before described, thus opening only the lower valve, which may be sufficient, in most cases, to let the water pass off.

Witnesses.
Ebh. Haskell.
George Pierce.
(762 words)

Elijah Whiton.

Exd [illegible]

Drawing